(12) United States Patent  
Falkowski et al.

(10) Patent No.: US 7,140,638 B2
(45) Date of Patent: Nov. 28, 2006

(54) INFLATOR FILTER RETAINER

(75) Inventors: Czeslaw C. Falkowski, Gilbert, AZ (US); Ahmad K. Al-Amin, Slough (GB)

(73) Assignee: TRW Vehicle Safety Systems, Inc., Washington, MI (US)

( * ) Notice: Subject to any disclaimer, the term of this patent is extended or adjusted under 35 U.S.C. 154(b) by 386 days.

(21) Appl. No.: 10/818,737

(22) Filed: Apr. 6, 2004

(65) Prior Publication Data

US 2005/0218636 A1 Oct. 6, 2005

(51) Int. Cl.
*B60R 21/26* (2006.01)

(52) U.S. Cl. .................. 280/736; 280/741; 280/742

(58) Field of Classification Search ............. 280/730.2, 280/737, 741, 736, 740, 742
See application file for complete search history.

(56) References Cited

U.S. PATENT DOCUMENTS

| | | | | |
|---|---|---|---|---|
| 3,898,048 | A | * | 8/1975 | Barber et al. ............... 422/165 |
| 5,345,875 | A | * | 9/1994 | Anderson ................... 102/530 |
| 5,711,547 | A | | 1/1998 | Blumenthal et al. |
| 5,720,495 | A | | 2/1998 | Faigle et al. |
| 6,250,673 | B1 | * | 6/2001 | Unterforsthuber et al. .. 280/741 |
| 6,273,462 | B1 | | 8/2001 | Faigle et al. |
| 6,439,604 | B1 | * | 8/2002 | Al-Amin et al. ............ 280/736 |
| 6,966,578 | B1 | * | 11/2005 | Smith ........................ 280/736 |

FOREIGN PATENT DOCUMENTS

| | | |
|---|---|---|
| DE | 3832120 | 3/1990 |
| DE | 4138888 | 6/1992 |
| DE | 4443681 | 6/1996 |
| DE | 19802548 | 8/1998 |
| DE | 10103110 | 8/2001 |
| DE | 10006280 | 9/2001 |

* cited by examiner

*Primary Examiner*—Paul N. Dickson
*Assistant Examiner*—Laura B Rosenberg
(74) *Attorney, Agent, or Firm*—Tarolli, Sundheim, Covell & Tummino LLP

(57) ABSTRACT

An inflator (14) includes a structure (50, 70, 90) that helps define a chamber (42) from which inflation fluid flows. The structure (50, 70, 90) includes an end cap (90) having a side wall (92). A closure member (104) is rupturable to release inflation fluid from the chamber (42). An initiator (230) is actuatable to rupture the closure member (104). A filter retainer (170) includes a side wall (172) that defines a cavity (176). The side wall (172) of the filter retainer (170) includes a rim portion (196) that forms a terminal end of the side wall. A filter assembly (120) is positioned in the cavity (176) of the filter retainer (170). First segments (260) of the rim portion (196) are deformed to clamp the filter assembly (120) to the filter retainer (170). Non-deformed second segments (262) of the rim portion (196) engage an inner surface (264) of the side wall (92) of the end cap (90). The second segments (262) help position the end cap (90) and the filter retainer (170) coaxially with each other.

22 Claims, 4 Drawing Sheets

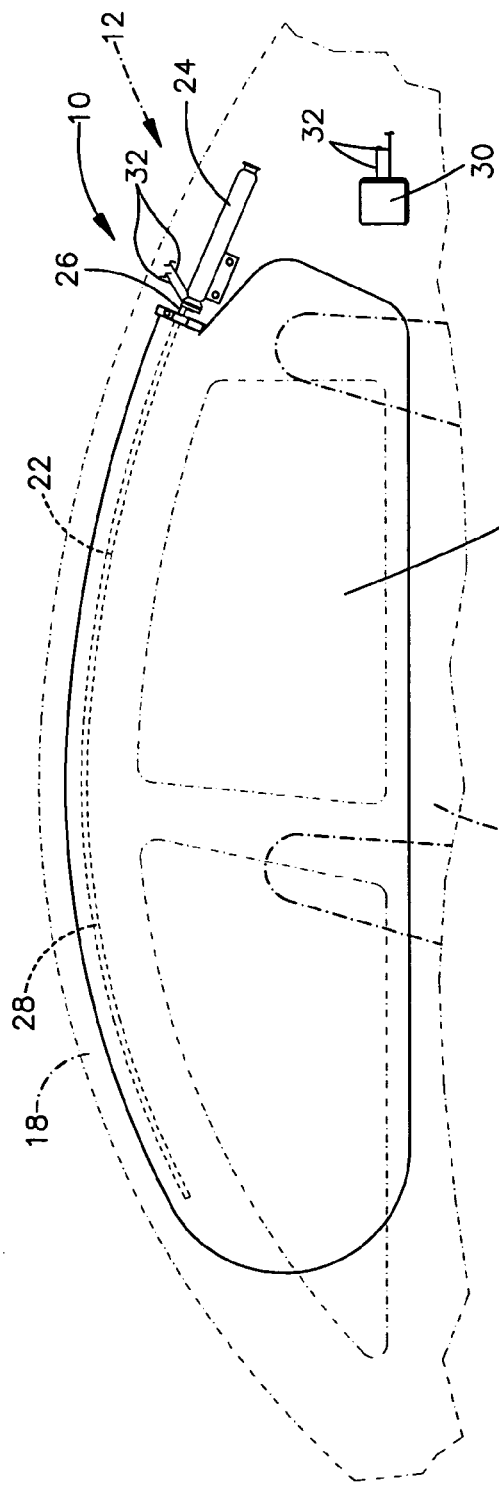
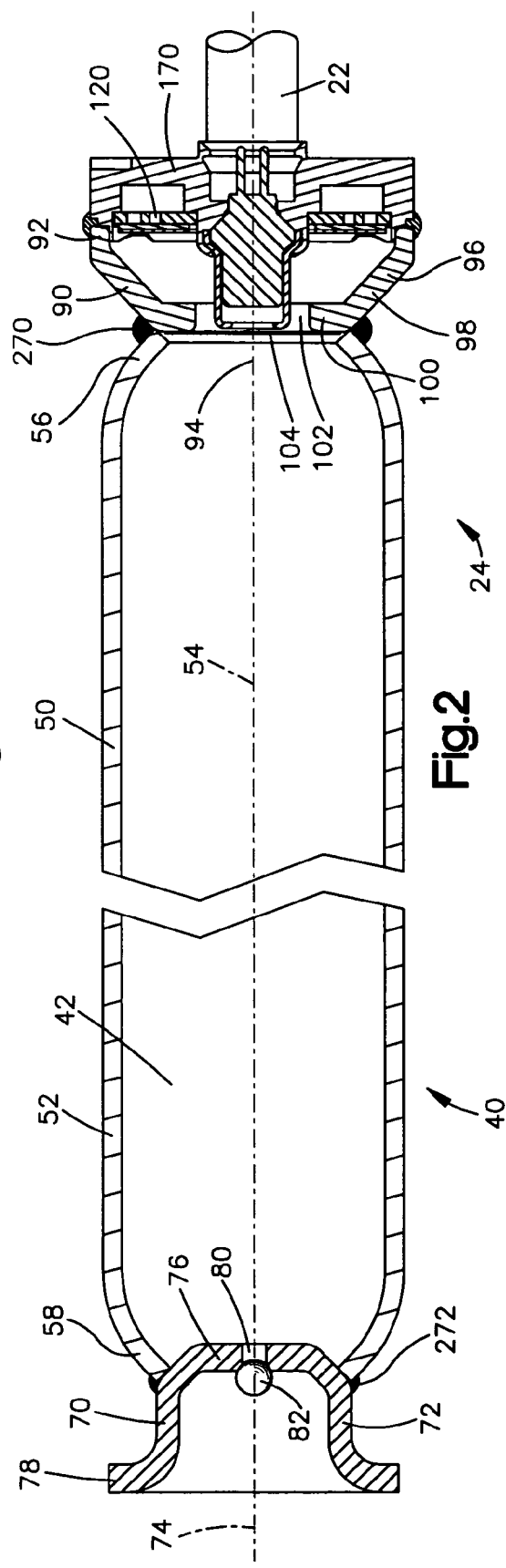

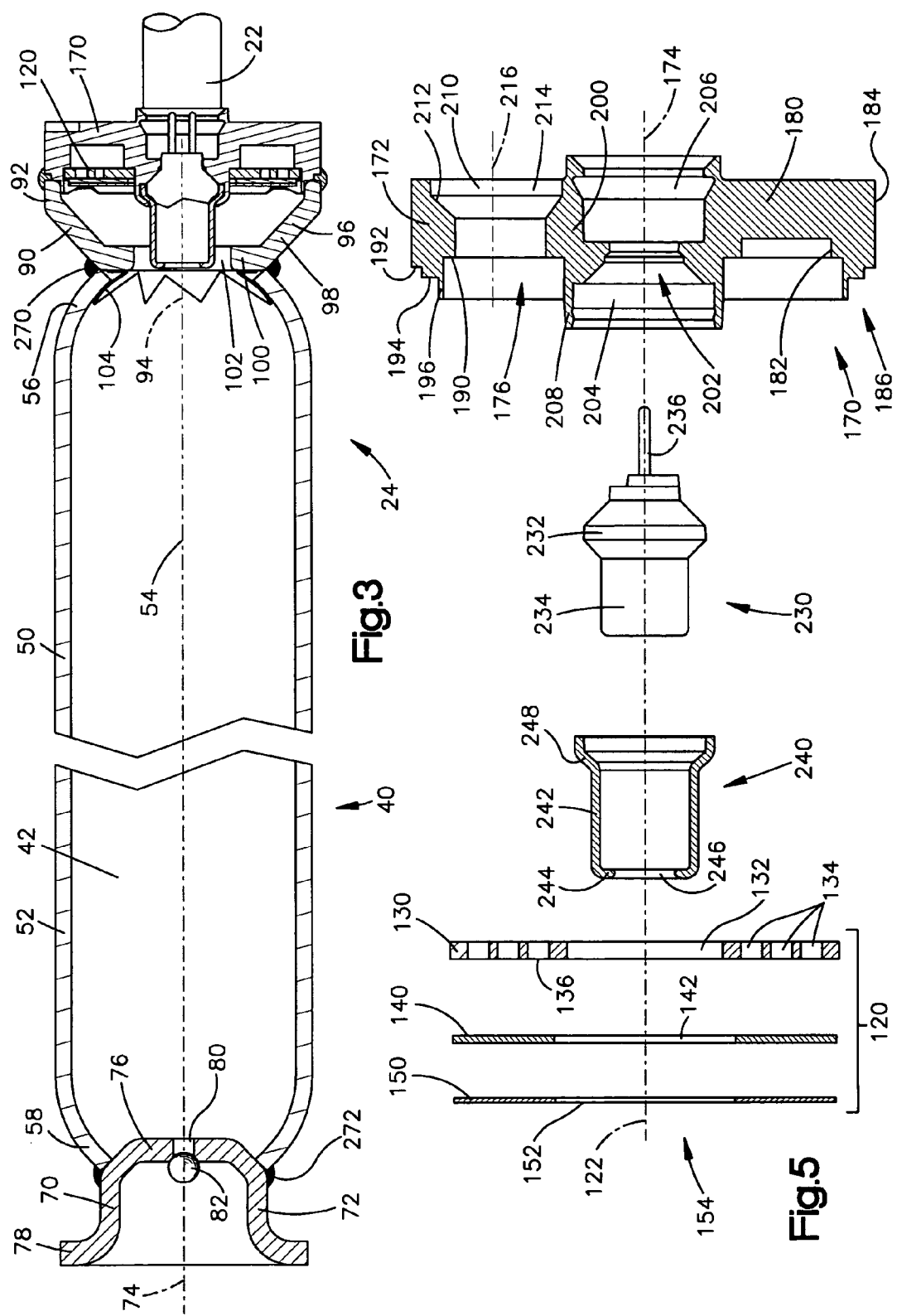

INFLATOR FILTER RETAINER

FIELD OF THE INVENTION

The present invention relates to an inflator that provides inflation fluid for inflating an inflatable vehicle occupant protection device.

BACKGROUND OF THE INVENTION

It is known to inflate an inflatable vehicle occupant protection device to help protect a vehicle occupant in the event of a vehicle collision. One particular type of inflatable vehicle occupant protection device is a inflatable curtain that inflates from the roof of the vehicle downward inside the passenger compartment between a vehicle occupant and the side structure of the vehicle in the event of a side impact or rollover. A known inflatable curtain is inflated from a deflated condition by inflation fluid directed from an inflator to the inflatable curtain through a fill tube.

Another type of inflatable vehicle occupant protection device is a front air bag inflatable by inflation fluid directed into the air bag from an inflator. A driver side front air bag is inflated from a stored position in a vehicle steering wheel to a deployed position between an occupant of a front driver side seat and the steering wheel/instrument panel of the vehicle. A passenger side front air bag is inflated from a stored position in the instrument panel to a deployed position between an occupant of a front passenger side seat and the instrument panel.

Another type of inflatable vehicle occupant protection device is a side impact air bag inflatable between the side structure of the vehicle and a vehicle occupant. Side impact air bags may be stored in a variety of locations in the vehicle, such as the side structure, seat, door, or floor of the vehicle. A side impact air bag may be inflated by inflation fluid directed into the air bag from an inflator. Other types of inflatable vehicle occupant protection devices include inflatable seat belts and inflatable knee bolsters.

SUMMARY OF THE INVENTION

The present invention relates to an inflator that includes a structure that defines a chamber from which inflation fluid flows. The structure includes an end cap having a side wall. A closure member is rupturable to release inflation fluid from the chamber. An initiator is actuatable to rupture the closure member. A filter retainer includes a side wall that defines a cavity. The side wall of the filter retainer includes a rim portion that forms a terminal end of the side wall. A filter assembly is positioned in the cavity of the filter retainer. First segments of the rim portion are deformed to clamp the filter assembly to the filter retainer. Non-deformed second segments of the rim portion engage an inner surface of the side wall of the end cap. The second segments help position the end cap and the filter retainer coaxially with each other.

The present invention also relates to an apparatus for helping to protect an occupant of a vehicle that has a side structure and a roof. The apparatus includes an inflatable curtain inflatable away from the roof to a position adjacent the side structure. A fill tube has a portion disposed in the inflatable curtain. An inflator provides inflation fluid to the inflatable curtain through the fill tube. The inflator includes a structure defining a chamber from which inflation fluid flows. The structure includes an end cap that has a side wall. A closure member is rupturable to release the inflation fluid from the chamber. An initiator is actuatable to rupture the closure member. A filter retainer includes a side wall that defines a cavity. The side wall of the filter retainer includes a rim portion that forms a terminal end of the side wall. A filter assembly is positioned in the cavity of the filter retainer. First segments of the rim portion are deformed to clamp the filter assembly to the filter retainer. Non-deformed second segments of the rim portion engage an inner surface of the side wall of the end cap. The second segments help position the end cap and the filter retainer coaxially with each other.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic side view illustrating an apparatus for helping to protect an occupant of a vehicle, according to an embodiment of the present invention;

FIG. 2 is a schematic sectional view of an inflator portion of the apparatus of FIG. 1 in a non-actuated condition;

FIG. 3 is a schematic sectional view of the inflator of FIG. 2 in an actuated condition;

FIG. 5 is an exploded view, partially in section, of the portion of the inflator of FIG. 4.

DESCRIPTION OF AN EMBODIMENT

Figure 2A:
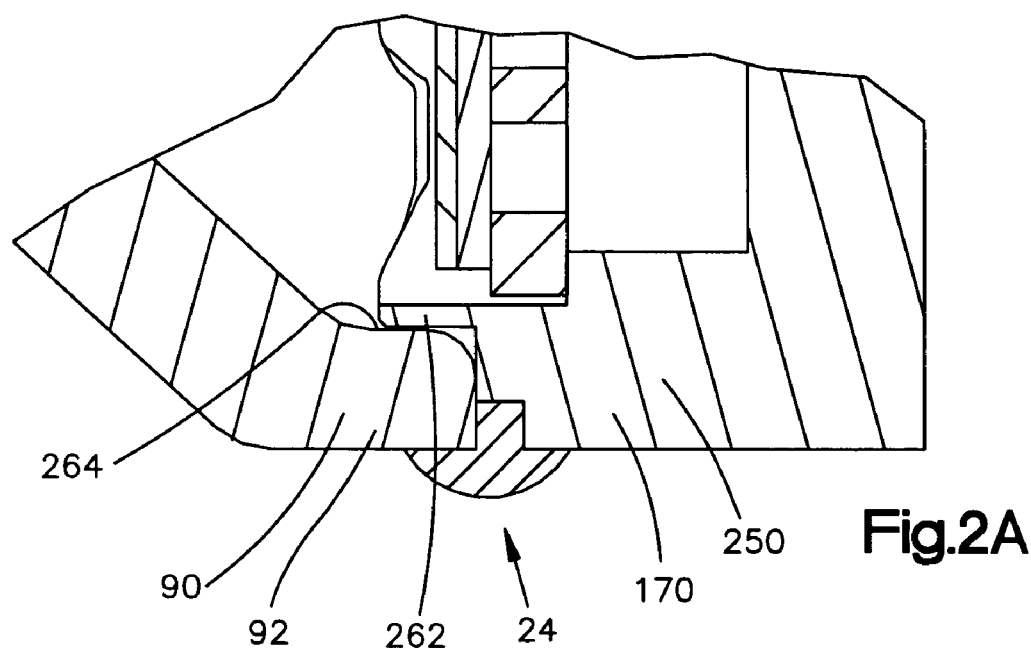
FIG. 2A is a magnified view of a portion of the inflator of FIG. 2.

The present invention relates to an apparatus for helping to protect an occupant of a vehicle. In particular, the present invention relates to an inflator for providing inflation fluid for inflating an inflatable vehicle occupant protection device, such as an inflatable curtain or air bag. Representative of the present invention, FIG. 1 illustrates an apparatus 10 for helping to protect an occupant (not shown) of a vehicle 12.

In the illustrated embodiment, the apparatus 10 comprises an inflatable vehicle occupant protection device 14 in the form of an inflatable curtain. The protection device 14 may have a variety of alternative configurations (not shown), such as an inflatable front impact air bag (driver side or passenger side), a side impact air bag (side structure, door, seat, or floor mounted), an inflatable knee bolster, or an inflatable seat belt.

The inflatable curtain 14 is mounted adjacent the side structure 16 of the vehicle 12 and the roof 18 of the vehicle. An inflator 24 is connected in fluid communication with the inflatable curtain 14 through a fill tube 22. The fill tube 22 may be constructed of any suitable material, such as metal or plastic. The fill tube 22 has a first end portion 26 for receiving fluid from the inflator 24. The fill tube 22 may be connected directly to the inflator 24, as described below, or a manifold (not shown) may connect the fill tube to the inflator. The fill tube 22 has a second end portion 28 disposed in the inflatable curtain 14. The second end portion 28 of the fill tube 22 may extend along the length of the inflatable curtain 14 to help distribute inflation fluid along the length of the curtain.

The vehicle 12 includes a sensor mechanism 30 (shown schematically in FIG. 1) for sensing the occurrence of an event for which inflation of the inflatable curtain 14 is desired, such as a side impact to the vehicle 12 and/or a vehicle rollover. Upon sensing the occurrence of such an event, the sensor mechanism 30 provides an electrical signal over lead wires 32 to the inflator 24. In response to the signal from the sensor 30, the inflator 24 is actuated and discharges inflation fluid into fill tube 22, which directs the fluid into the inflatable curtain 14.

The inflatable curtain 14 inflates under the pressure of the inflation fluid from the inflator 24. The inflatable curtain 14 inflates away from the roof 18 in a downward direction as shown in FIG. 1 and in a downward direction with respect to the direction of forward travel of the vehicle 12 to the position illustrated in FIG. 1. The inflatable curtain 14, when inflated, extends along the side structure 16 of the vehicle 12 and is positioned between the side structure and occupant(s) of the vehicle. The inflatable curtain 14, when inflated, helps to absorb the energy of impacts with the curtain and helps to distribute the impact energy over a large area of the curtain.

The inflator 24 contains a stored quantity of pressurized inflation fluid (not shown) in the form of a gas for inflating the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 24 could be of any suitable type for supplying a medium for inflating the inflatable curtain 14.

Referring to FIGS. 2 and 3, the inflator 24 includes a structure 40 that defines a chamber 42 from which inflation fluid flows when the inflator is actuated. In the illustrated embodiment, the inflator 24 is a stored gas inflator in which a pressurized gas, such as helium, is stored in the chamber 42. The inflator 24 could, however, be an alternative inflator type such as pyrotechnic, augmented, or hybrid.

In the illustrated embodiment, the structure 40 includes a container portion 50, a fill cap 70 and an end cap 90. The container portion 50 has a generally cylindrical side wall 52 centered on a longitudinal axis 54. The side wall 52 has a first end portion 56 and an opposite end portion 58. As shown in FIGS. 2 and 3, the first and second end portions 56 and 58 of the side wall 52 may be configured to extend in a direction transverse to and toward the axis 54 (i.e., rounded or tapered toward the axis).

The fill cap 70 has a generally cylindrical side wall portion 72 centered on a longitudinal axis 74. The fill cap 70 also includes an end wall portion 76 that spans the open diameter of the side wall portion 72 at an end of the side wall. The fill cap 70 may further include a flange portion 78 that extends from an end of the side wall portion 72 opposite the end wall portion 76 in a direction transverse to and away from the axis 74. The end wall portion 76 includes a fill aperture 80 through which inflation fluid may be directed to fill the chamber 42. A ball stop 82 may be fixed to the end wall portion 76 by means (not shown), such as welding, to block leakage of inflation fluid through the aperture 80 once the chamber 42 is filled.

The end cap 90 has a generally cylindrical side wall 92 centered on a longitudinal axis 94 of the end cap. The end cap 90 also includes an end wall 96 that is centered on the axis 94. The end wall 96 includes a frusto-conical portion 98 and a ring-shaped portion 100, each of which extends transverse to and toward the axis 94. An opening 102 in the end wall 96 extends through the ring-shaped portion 100. As shown in FIG. 2, a rupturable closure member 104, such as a burst disk, is connected to the ring-shaped portion 100 of the end wall 96 and spans the opening 102. The closure member 104 may be connected to the end wall 96 by known means (not shown), such as welding, an adhesive, a mechanical connection (e.g., press-fit), or a combination thereof.

Figure 4:
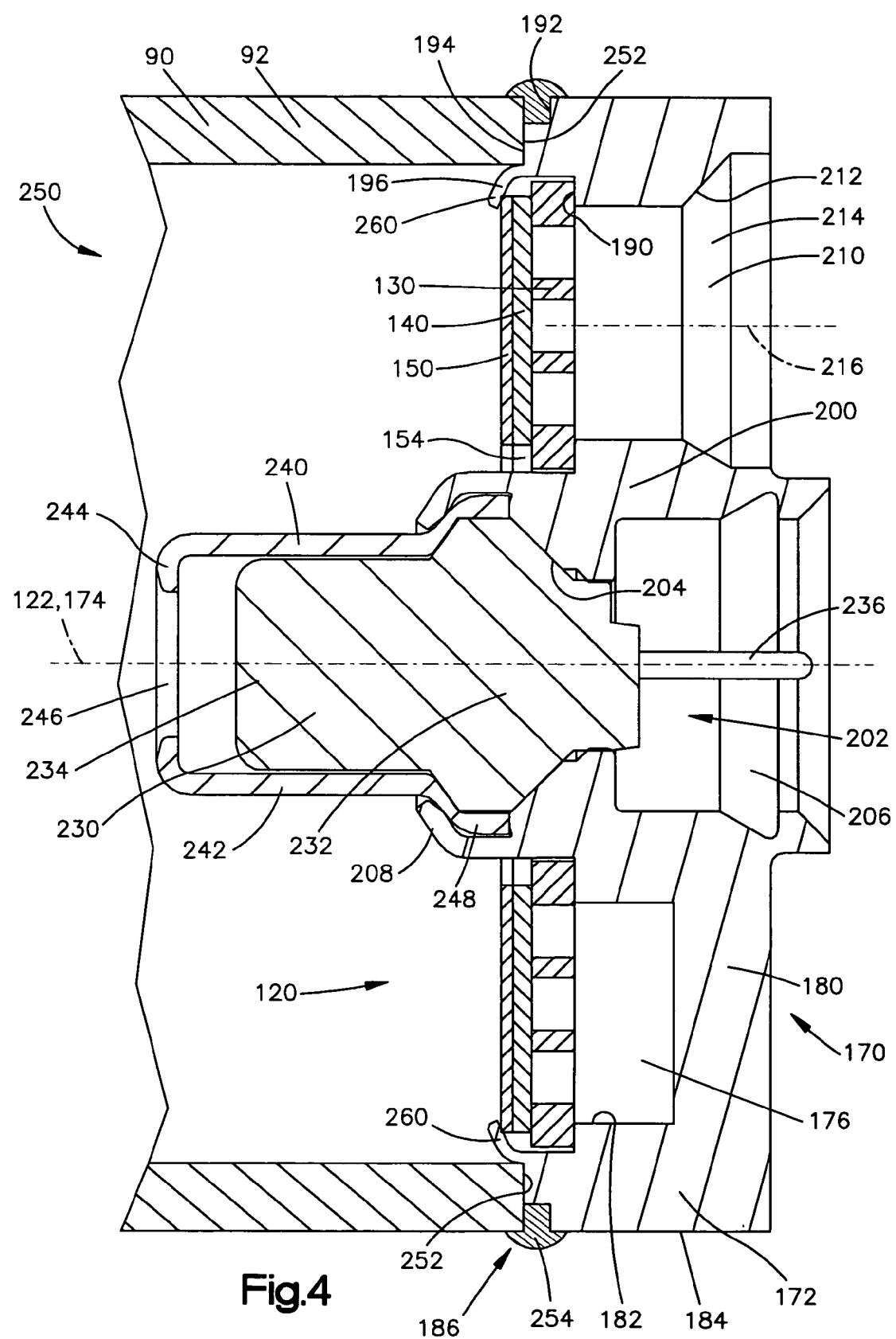
FIG. 4 is a magnified sectional view of a portion of the inflator of FIGS. 1–3.

The inflator 24 also includes a filter assembly 120 and a filter retainer 170 for supporting the filter assembly. Referring to FIGS. 4 and 5, the filter assembly 120 has a generally cylindrical or disk shaped configuration centered on an axis 122. The filter assembly 120 includes a support plate 130, a first filter sheet 140, and a second filter sheet 150. The filter assembly 120 could, however, include one or more filter sheets. The support plate 130 and the filter sheets 140 and 150 may be connected to each other by various means, such as welding, sintering, adhesives, or bonding agents. The filter sheets 140 and 150 may have diameters equal to or different (e.g., smaller) than the diameter of the support plate 130.

The support plate 130 has a generally disk shaped configuration and is centered on the axis 122. The support plate 130 is formed from a high strength material, such as a high strength carbon steel. The support plate 130 (FIG. 5) includes a circular central aperture 132 centered on the axis 122 and a plurality of filter apertures 134 spaced radially about the support plate. The size, number, and spacing of the filter apertures 134 may vary, depending upon a variety of factors, such as the desired fluid flow through the filter assembly 120.

The first filter sheet 140 is disposed on a first surface 136 of the support plate 130. The first filter sheet 140 comprises a wire mesh filter media sheet for collecting particulates. The first filter sheet 140 may, for example, be a mesh formed from wire or other suitable filament materials arranged in a dutch weave pattern. The first filter sheet 140 includes a circular central aperture 142 centered on the axis 122.

The second filter sheet 150 is disposed on a surface of the first filter sheet 140 opposite the support plate 130. The second filter sheet 150 comprises a relatively thin sheet of material, such as stainless steel, that is perforated, i.e., has small holes pierced throughout its area. The size, number, and spacing of holes pierced in the second filter sheet 150 may vary, depending upon a variety of factors, such as the desired fluid flow through the filter assembly 120. The second filter sheet 150 includes a circular central aperture 152 centered on the axis 122. The aperture 132 of the support plate 130, the aperture 142 of the first filter sheet 140, and the aperture 152 of the second filter sheet 150 combine to form a central aperture 154 of the filter assembly 120.

The filter retainer 170 supports the filter assembly 120. The filter retainer 170 includes a generally cylindrical side wall 172 centered on a longitudinal axis 174. The side wall 172 helps define a cavity 176 in the filter retainer 170. The filter retainer 170 also includes an end wall 180 that spans the diameter of (extends across) the side wall 172 and helps further to define the cavity 176.

The side wall 172 has an inner surface 182 and an opposite outer surface 184. The side wall 172 also has a terminal end portion 186 opposite the end wall 180. Along the end portion 186 of the side wall 172, the inner surface 182 has a diameter that is increased from that of the remainder of the inner surface of the side wall. This forms an annular inner shoulder portion 190 at the end portion 186 of the side wall 172.

Also, along the end portion of the side wall 172, the outer surface 184 has a diameter that is decreased a first amount from that of the remainder of the outer surface of the side wall. This forms an annular first outer shoulder portion 192 of the end portion 186 of the side wall 172. Adjacent the first outer shoulder portion 192 and along the end portion of the side wall 172, the outer surface 184 has a diameter that is decreased a second amount, greater than the first amount, from that of the remainder of the outer surface of the side wall. This forms an annular second shoulder portion 194 and an annular rim portion 196 of the end portion 186 of the side wall 172. The rim portion 196 forms a terminal end of the side wall 172.

The filter retainer 170 includes a central portion 200 centrally located on the end wall 180 and centered on the axis 174. The central portion 200 is formed by several hollow cylindrical and hollow frusto-conical segments of varying diameters. These segments define a central passage 202 that extends through the central portion 200. These segments also define an initiator receiving portion 204 of the central portion 200 and a connector receiving portion 206 of the central portion. The initiator receiving portion 204 includes an annular rim portion 208 that forms a first terminal end of the central portion 200.

The filter retainer 170 also includes a discharge passage 210 that extends through the end wall portion 180. The discharge passage 210 is centered on an axis 216 that is offset from and parallel to the axis 174 of the filter retainer 170. The discharge passage 210 is defined by an inner surface 212 that has several cylindrical and frusto-conical segments of varying diameters. These segments define a fill tube receiving portion 214 of the discharge passage 210.

The inflator 24 also includes an initiator 230 and a support barrel 240. The initiator 230 may have a variety of known configurations. In the illustrated embodiment, the initiator 230 includes a body portion 232, a cylindrical squib portion 234, and a pair of leads 236 that protrude from the body portion opposite the squib portion. The body portion 232 is formed by several cylindrical and frusto-conical segments of varying diameters.

The support barrel 240 has a generally cylindrical side wall 242 and a terminal end wall 244. The end wall 244 includes a centrally located opening 246. The side wall 242 has a terminal end portion opposite the end wall 244 with an increased diameter that helps define an annular shoulder portion 248 of the support barrel 240.

In an assembled condition of the inflator 24, the initiator 230 and support barrel 240 are assembled with the central portion 200 of the filter retainer 170. The initiator 230 is inserted in the initiator receiving portion 204 and the terminals 236 extend through the central passage 202 into the connector receiving portion 206. The body portion 232 of the initiator 230 engages and mates with an inner surface of the initiator receiving portion 204.

The support barrel 240 is placed over the initiator 230 such that the shoulder portion 248 engages and mates with the body portion 232 of the initiator. The squib portion 234 may engage and mate with an inner surface of the side wall 242 and is positioned adjacent or near the opening 246 in the end wall 244.

With the initiator 230 and the support barrel 240 positioned in the central portion 200 of the filter retainer 170, the rim portion 208 is crimped (i.e., bent or deformed) onto the shoulder portion 248. The rim portion 208 clamps the support barrel 240 and the initiator 230 to the central portion 200 and thereby connects the initiator and support barrel to the filter retainer 170.

The filter assembly 120 is also assembled with the filter retainer 170. The filter assembly 120 is placed in the cavity 176 of the filter retainer such that the support plate 130 is positioned against the inner shoulder portion 190. The central portion 200 of the filter retainer 170 and the initiator 230 extend through the aperture 154 of the filter assembly 120. The outside diameter of the filter assembly 120 may be less than the diameter of the inner surface 182 of the side wall 172 adjacent the shoulder portion 190, resulting in a clearance between the outer periphery of the filter assembly and the inner surface of the side wall. The diameter of the aperture 154 may also be less than the outside diameter of the central portion 200 of the filter retainer 170, resulting in a clearance between the inner periphery of the filter assembly 120 and the central portion of the filter retainer.

With the filter assembly 120 seated against the inner shoulder portion 190 of the filter retainer 170, the rim portion 196 is deformed onto the filter assembly 120 to connect the filter assembly to the filter retainer 170. The rim portion 196 may be deformed using a variety of known operations, such as staking, crimping, and bending. The rim portion 196 is deformed into engagement with the second filter sheet 150 and may also engage the first filter sheet 140 and/or the support plate 130. The filter assembly 120 is thus clamped between the rim portion 196 and the inner shoulder portion 190 of the filter retainer 170. Assembled together, the filter retainer 170, filter assembly 120, initiator 230 and support barrel 240 form an assemblage 250 shown in FIG. 5.

Figure 6:
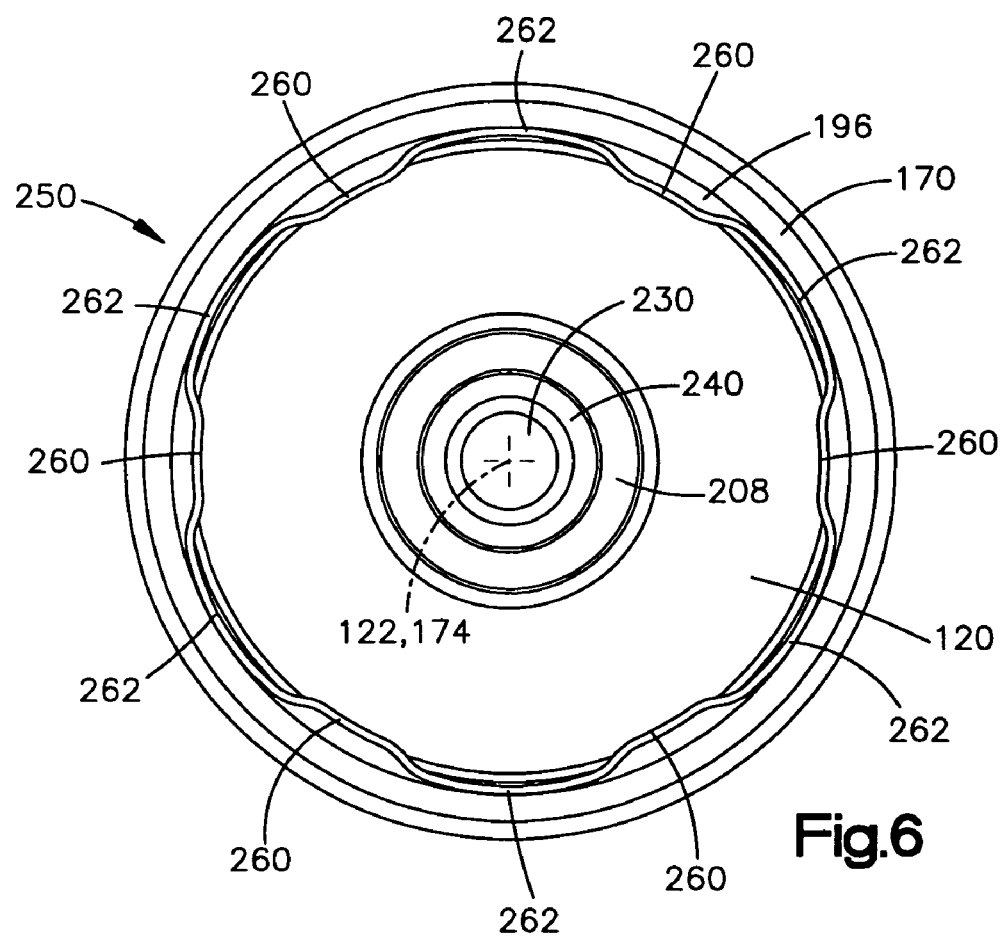
FIG. 6 is an end view of the portion of the inflator of FIG. 4.

According to the present invention, the rim portion 196 is deformed along first segments 260 that are spaced about the rim portion, as shown in FIG. 6. This leaves non-deformed second segments 262 of the rim portion 196, which are spaced about the rim portion between the first segments in a circular pattern along the circumference of the rim portion. The first and second segments 260 and 262 may be formed, for example, using a die or similar tooling in a press operation that forms the segments simultaneously.

In the embodiment illustrated in FIG. 6, there are six first segments 260 and six second segments 262. There could, however, be more or fewer first segments 260 and, thus, more or fewer second segments 262. Also, the angular length of the first and second segments 260 and 262 may be longer or shorter than illustrated in FIG. 6.

The first segments 260 serve to clamp the filter assembly 120 to the filter retainer. Depending on the amount of clearance between the filter assembly 120 and the side wall 172 and central portion 200 (see FIG. 4), the first segments may also help position the filter assembly coaxially with the filter retainer 170. For example, if the filter assembly 120 is axially offset from the filter retainer 170, portions of the filter assembly will be positioned closer to the rim portion 196 than others. As a result, at the onset of the operation in which the first segments 260 are simultaneously formed, certain ones of the first segments (i.e., the ones closer to the filter assembly) may engage the filter assembly 120 before the other first segments. As a result, as the first segments 260 are formed, the ones engaging the filter assembly 120 first may urge the filter assembly toward the other first segments and thus may help align the axis 122 of the filter assembly with the axis 174 of the filter retainer 170.

In the assembled condition of the inflator 24, the assemblage 250 (FIG. 4) is connected with the end cap 90. A terminal end surface 252 of the side wall 92 of the end cap 90 is received in and engages the second outer shoulder portion 194 of the filter retainer 170. The assemblage 250 may then be connected to the end cap 90 by means such as a weld 254. A clearance between the end cap 90 and the filter retainer 170 created by the first outer shoulder portion 192 may facilitate the weld 254.

According to the present invention, the second segments 262, being non-deformed and arranged in a circular pattern, help position the filter retainer 170 and the assemblage 250 coaxially with the end cap 90. This is best shown in the magnified view of FIG. 2A. When the assemblage 250 and the end cap 90 are brought together, the second segments 262 become positioned along an inner surface 264 of the side wall 92 of the end cap. The outside diameter of the rim portion 194 and the inside diameter of the side wall 92 are selected to be about equal or within a predetermined tolerance so that the filter retainer 170 and end cap 90 align coaxially when fitted together with each other. In this way, the filter retainer 170 and end cap 90 align themselves and may be connected without the need to provide special tooling or handling to position the parts relative to each other.

In the assembled condition of the inflator 24 (FIGS. 2 and 3), the end cap 90 fixed to the first end portion 56 of the container portion 50 by means 270, such as a weld. This connects the end cap 90, and thus the assemblage 250, to the container portion 50. The fill cap 70 is also connected to the container portion by means 272, such as a weld.

From the above description of the invention, those skilled in the art will perceive improvements, changes and modifications. For example, although the illustrated embodiment has been shown having an overall generally cylindrical configuration with generally circular cross-sections, alternative configurations, such as ones having rectangular or polygonal cross-sections, may also be implemented and incorporate the features of the present invention described above. These and other such improvements, changes and modifications within the skill of the art are intended to be covered by the appended claims.

Having described the invention, the following is claimed:

1. An inflator comprising:
    a structure defining a chamber from which inflation fluid flows, said structure including an end cap having a side wall;
    a closure member rupturable to release said inflation fluid from said chamber;
    an initiator actuatable to rupture said closure member;
    a filter retainer including a side wall defining a cavity, said side wall of said filter retainer including a rim portion forming a terminal end of said side wall; and
    a filter assembly positioned in said cavity of said filter retainer, first segments of said rim portion being deformed to clamp said filter assembly to said filter retainer, non-deformed second segments of said rim portion engaging an inner surface of said side wall of said end cap, said second segments helping position said end cap and said filter retainer coaxially with each other.

2. The inflator recited in claim 1, wherein each of said side wall of said end cap and said side wall of said filter retainer has a generally cylindrical configuration, said second segments of said rim portion being arranged in a generally cylindrical pattern.

3. The inflator recited in claim 2, wherein said cylindrical side walls of said end cap and said filter retainer are each centered on a longitudinal axis, said axis of said end cap and said axis of said filter retainer being coaxial with each other when said second segments help position said end cap and said filter retainer.

4. The inflator recited in claim 3, wherein said structure defining said chamber has a generally cylindrical configuration centered on a longitudinal axis, said axis of said structure being coaxial with said axis of said end cap and said axis of said filter retainer when said second segments help position said end cap and said filter retainer.

5. The inflator recited in claim 4, wherein said structure defining a chamber further comprises an elongated generally cylindrical container portion and a fill cap, said end cap being connected to a first end portion of said container portion, said fill cap being connected to a second end portion of said container portion.

6. The inflator recited in claim 1, wherein said filter retainer includes a shoulder portion projecting from an inner surface of said side wall of said filter retainer, said filter assembly engaging said shoulder portion and being clamped between said first segments of said rim portion and said shoulder portion.

7. The inflator recited in claim 1, wherein said filter retainer includes an end wall that extends across said side wall and further defines said cavity, said end wall including an opening for discharging said inflation fluid when released from said chamber.

8. The inflator recited in claim 7, wherein said end wall includes a central support portion for supporting said initiator.

9. The inflator recited in claim 8, further comprising an initiator support barrel supported with said initiator by said central support portion.

10. The inflator recited in claim 9, wherein said initiator and said initiator support barrel are connected to said central support portion by a crimp.

11. The inflator recited in claim 7, wherein said filter assembly includes central opening, portions of said filter assembly surrounding said central opening being supported on said central support portion of said end wall.

12. The inflator recited in claim 1, wherein said end cap supports said closure member.

13. The inflator recited in claim 1, wherein said filter assembly comprises:
    a filter support plate having a periphery engaging said side wall of said filter retainer; and
    at least one filter sheet overlying said support plate, said first portions of said rim portion being deformed into engagement with said at least one filter sheet to clamp said filter assembly to said filter retainer.

14. The inflator recited in claim 13, wherein said filter assembly includes central opening extending through said filter support plate and said at least one filter plate, said initiator extending through said central opening of said filter assembly to position said initiator near said closure member.

15. The inflator recited in claim 13, wherein said support plate and said at least one filter sheet have generally disc-shaped configurations.

16. The inflator recited in claim 15, wherein said support plate has a first diameter and said at least one filter plate has a second diameter smaller than said first diameter.

17. The inflator recited in claim 13, wherein said support plate and said at least one filter sheet are bonded to each other to form said filter assembly.

18. The inflator recited in claim 13, wherein said support plate has a generally rigid metal construction with a plurality of holes bored through the plate.

19. The inflator recited in claim 13, wherein said at least one filter sheet has at least one of a wire mesh construction and a perforated metal sheet construction.

20. The inflator recited in claim 13, wherein said structure defining a chamber comprises a container for storing inflation fluid under pressure.

21. An inflator comprising:
   a source from which inflation fluid flows, said source including a part having a side wall;
   a filter retainer including a side wall defining a cavity, said side wall of said filter retainer including a rim portion forming a terminal end of said side wall; and
   a filter assembly positioned in said cavity of said filter retainer, first segments of said rim portion being deformed to clamp said filter assembly to said filter retainer, non-deformed second segments of said rim portion engaging an inner surface of said side wall of said part, said second segments helping position said part and said filter retainer coaxially with each other.

22. An apparatus for helping to protect an occupant of a vehicle that has a side structure and a roof, said apparatus comprising:
   an inflatable curtain inflatable away from the roof to a position adjacent the side structure;
   a fill tube having a portion disposed in said inflatable curtain; and
   an inflator for providing inflation fluid to said inflatable curtain through said fill tube, said inflator comprising:
   a structure defining a chamber from which inflation fluid flows, said structure including an end cap having a side wall;
   a closure member rupturable to release said inflation fluid from said chamber;
   an initiator actuatable to rupture said closure member;
   a filter retainer including a side wall defining a cavity, said side wall of said filter retainer including a rim portion forming a terminal end of said side wall; and
   a filter assembly positioned in said cavity of said filter retainer, first segments of said rim portion being deformed to clamp said filter assembly to said filter retainer, non-deformed second segments of said rim portion engaging an inner surface of said side wall of said end cap, said second segments helping position said end cap and said filter retainer coaxially with each other.

* * * * *